United States Patent
Karrelmeyer et al.

(10) Patent No.: US 7,680,584 B2
(45) Date of Patent: Mar. 16, 2010

(54) PROCEDURE FOR THE OPERATION OF AN INTERNAL COMBUSTION ENGINE

(75) Inventors: Roland Karrelmeyer, Bietigheim-Bissingen (DE); Christina Sauer, Benningen (DE); Wolfgang Fischer, Gerlingen (DE); Andre F. Casal Kulzer, Boeblingen (DE); Juergen Haering, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 11/880,958

(22) Filed: Jul. 25, 2007

(65) Prior Publication Data

US 2009/0024302 A1     Jan. 22, 2009

(30) Foreign Application Priority Data

Jul. 27, 2006    (DE)    ........................ 10 2006 034 806

(51) Int. Cl.
*G06F 19/00* (2006.01)
*F02M 25/07* (2006.01)
*F02B 47/08* (2006.01)
*F02B 5/02* (2006.01)

(52) U.S. Cl. ........................ 701/105; 701/108; 123/305; 123/568.14

(58) Field of Classification Search ................. 123/295, 123/305, 347, 348, 399, 403, 568.11, 568.14, 123/568.21, 90.15–90.18; 701/101–105, 701/108, 111, 115
See application file for complete search history.

(56) References Cited

U.S. PATENT DOCUMENTS

| | | | |
|---|---|---|---|
| 6,260,520 B1 | 7/2001 | Van Reatherford | |
| 6,390,054 B1 | 5/2002 | Yang | |
| 6,536,407 B1 * | 3/2003 | Denbratt | 123/568.14 |
| 6,817,349 B2 * | 11/2004 | Awasaka et al. | 123/564 |
| 7,370,633 B2 * | 5/2008 | Kang et al. | 123/305 |
| 2002/0124831 A1 | 9/2002 | Kondo | |
| 2006/0196469 A1 | 9/2006 | Kuo et al. | |

FOREIGN PATENT DOCUMENTS

DE    199 27 479    12/1999

(Continued)

OTHER PUBLICATIONS

Narayanaswamy, K. et al "A Modeling Investigation of Combustion Control Variables During DI-Diesel HCCI Engine Transients" SAE paper 2006-01-1084, Apr. 2006. Part of SP 2005, "Homogeneous Charge Compression Ignition (HCCI) Combustion 2006", ISBN: 978-0-7680-1740-3.

*Primary Examiner*—Willis R Wolfe, Jr.
(74) *Attorney, Agent, or Firm*—Merchant & Gould P.C.

(57) ABSTRACT

A method of operating an internal combustion engine with direct gasoline injection and controlled self-ignition, wherein the internal combustion engine includes a combustion chamber, at least one intake valve and at least one exhaust valve each having an adjustable opening time. The method includes compressing an ignitable gas mixture that contains residual gas in the combustion chamber during a compression stroke, where the gas mixture self ignites, and altering step-wise over multiple combustion cycles at least one of a residual gas volume and a point of injection time to an interim value other than a value assigned to a target load during a load transfer from an initial load to the target load.

7 Claims, 4 Drawing Sheets

FOREIGN PATENT DOCUMENTS

Figure 4:
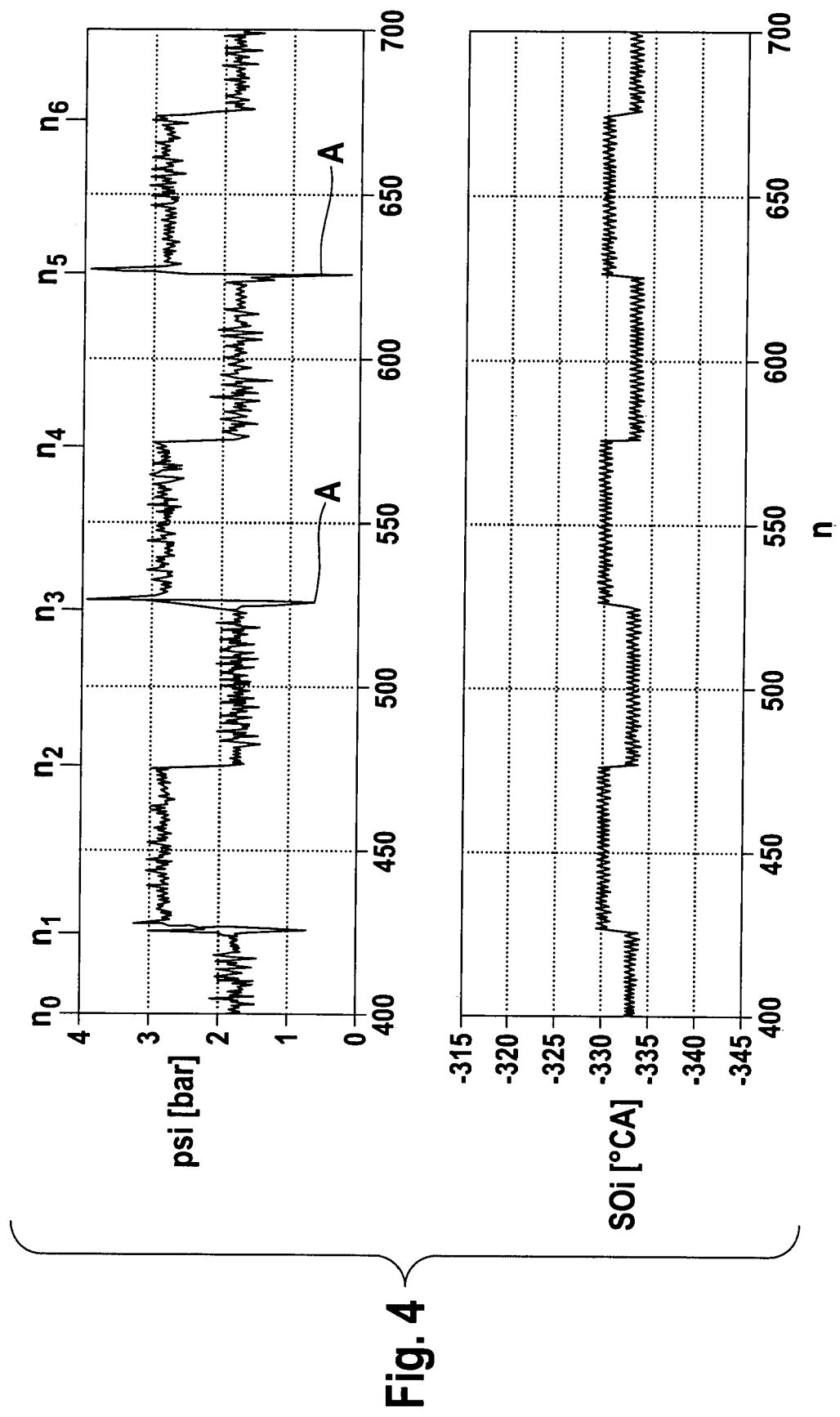

| | | |
|---|---|---|
| DE | 101 27 205 | 9/2002 |
| DE | 101 34 644 | 2/2003 |
| EP | 1 496 231 | 1/2005 |
| JP | 62113819 A * 5/1987 | ................. 123/295 |
| WO | WO 98/10179 | 3/1998 |

* cited by examiner

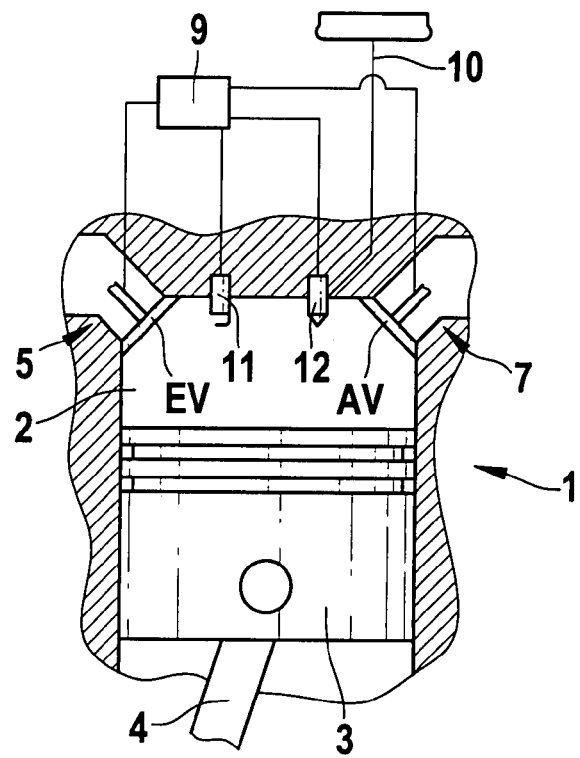
Fig. 1
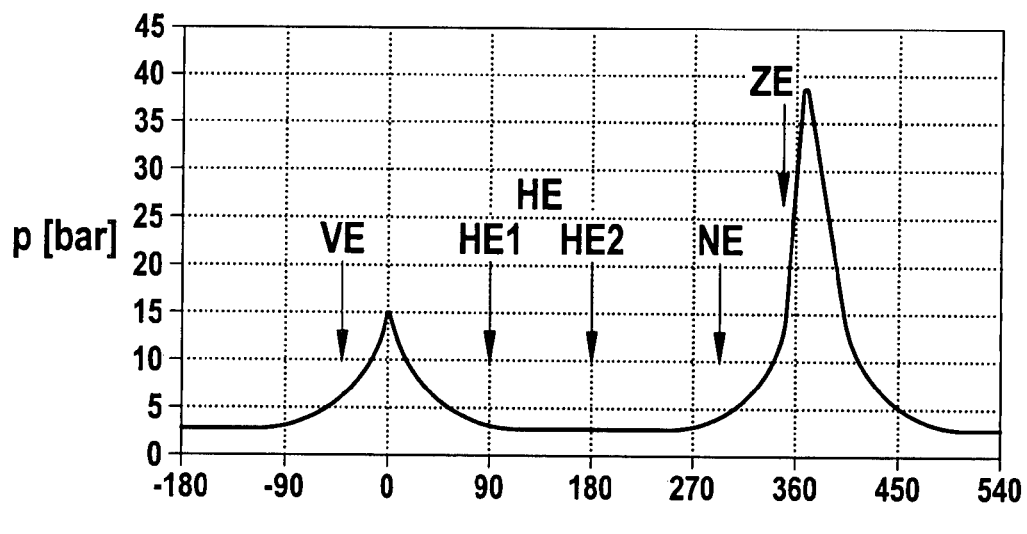
Fig. 2
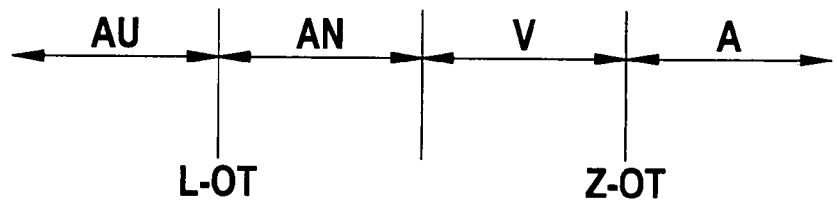

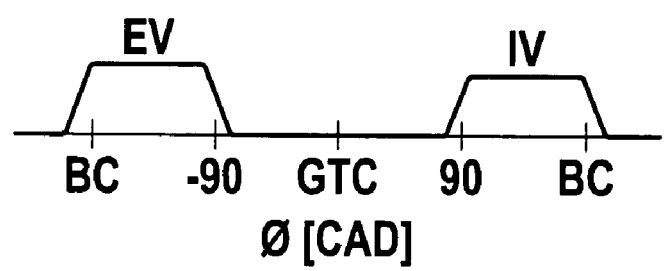
Fig. 3.1
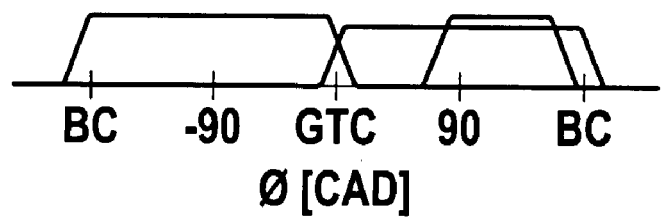
Fig. 3.2
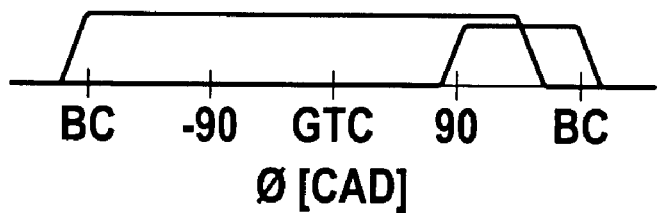
Fig. 3.3
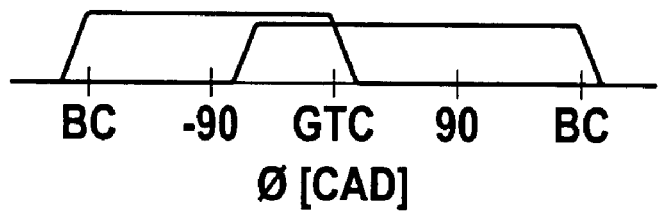
Fig. 3.4

PROCEDURE FOR THE OPERATION OF AN INTERNAL COMBUSTION ENGINE

STATE OF THE ART

The invention at hand concerns a procedure for the operation of an internal combustion engine, particularly a gasoline engine with direct gasoline injection and controlled self-ignition. The invention additionally concerns a control unit as well as a computer program to implement the procedure.

During the operation of an internal combustion engine in the HCCI mode (Homogenous Charge Compression Ignition), which is sometimes also referred to as CAI (Controlled Auto Ignition), ATAC (Active Thermo Atmosphere Combustion) or TS (Toyota Soken), the ignition of the air-fuel mixture does not result from an externally-supplied ignition but from a controlled self-ignition. The HCCI combustion process can, for example, be brought about by a high proportion of residual gases and/or by a high compression and/or by a high inlet temperature. A precondition for the self-ignition is a sufficiently high energy level in the cylinder. Internal combustion engines capable of being operated in the HCCI mode are known, which can concern gasoline as well as diesel engines. (See, for example the American patents U.S. Pat. No. 6,260,520, U.S. Pat. No. 6,390,054, the German patent DE 199 27 479 and the patent WO 98/10179.)

The HCCI combustion has the advantage of reduced fuel consumption and fewer toxic emissions in comparison to a conventional combustion with an externally-supplied ignition. However, the closed-loop control of the combustion process and particularly the open-loop control of the self-ignition of the mixture are not simple. Thus it requires the control of the control variables affecting the combustion process in a closed-loop. These control variables are, for example, for the fuel injection (injection quantities, respectively point of injection time and injection period), internal or external exhaust gas recirculation, intake and exhaust valves (variable valve control), exhaust gas backpressure (exhaust gas flap), if need be an ignition backup, incoming air temperature, fuel quality and compression ratio (with regard to internal combustion engines with a variable compression ratio).

When a load transfer occurs, misfires or advanced ignition, respectively retarded ignition, can take place in known procedures for the operation of a gasoline engine with self-ignition. There are not any steps known in the state of the art to prevent or reduce the occurrence of these.

DISCLOSURE OF THE INVENTION

A task of the invention at hand is, therefore, to present a procedure, a device and a computer program, which prevent or at least reduce the frequency of misfires, respectively a self-ignition occurring too early or too late, during a load transfer of the internal combustion engine.

This problem is solved by a procedure for the operation of an internal combustion engine, particularly a gasoline engine with direct gasoline injection and with controlled self-ignition, whereby the internal combustion engine comprises a combustion chamber, at least one intake valve and at least one exhaust valve, whose opening times can be altered, whereby an ignitable gas mixture, which contains residual gas, is compressed in the combustion chamber during a compression stroke, whereby the gas mixture self ignites during the compression stroke (preferably towards the end) and whereby during a load transfer from an initial load to a target load, the residual gas volume and/or the injection point in time is altered to an interim value other than a value assigned to the target load for at least one combustion cycle. In each case, set point values are assigned to the load values for the residual gas volume and the injection point in time. These are, however, not directly actuated as set point values. Initially an interim value other than the set point values is emitted as the set point value.

Provision is preferably made for the residual gas volume and/or the injection point in time to be altered from the interim value to the target value over multiple combustion cycles. In so doing, large steps with correspondingly large alterations of the combustion parameters are avoided.

Provision is preferably made for the residual gas volume and/or the injection point in time to be increased with respect to the target value to an interim value for at least one combustion cycle during a load transfer from a low to a high load and subsequently decreased step-by-step to a target value.

Provision is preferably made for the residual gas volume and/or the injection point in time to be decreased with respect to the target value to an interim value for at least one combustion cycle during a load transfer from a high to a low load and subsequently increased step-by-step to a target value.

The problem mentioned at the beginning of the application is also solved by a device, especially a control device with wherewithal for the operation of an internal combustion engine, particularly a gasoline engine with direct gasoline injection and a controlled self-ignition, whereby the internal combustion engine comprises a combustion chamber, at least one intake valve and at least one exhaust valve, whose opening times can be altered, and an ignitable gas mixture, which contains residual gas, is compressed in the combustion chamber during a compression stroke, whereby the gas mixture self ignites during the compression stroke; and whereby during a load transfer from an initial load to a target load, the residual gas volume and/or the injection point in time is altered for at least one combustion cycle to an interim value other than a value assigned to the target load.

The problem mentioned at the beginning of the application is also solved by a computer program with a program code for the implementation of all steps in accordance with a procedure according to the invention if the program is executed on a computer.

An example of embodiment of the invention at hand is explained in detail below using the accompanying diagrams. The following are thereby shown:

SHORT DESCRIPTION OF THE DIAGRAMS

Figure 5:
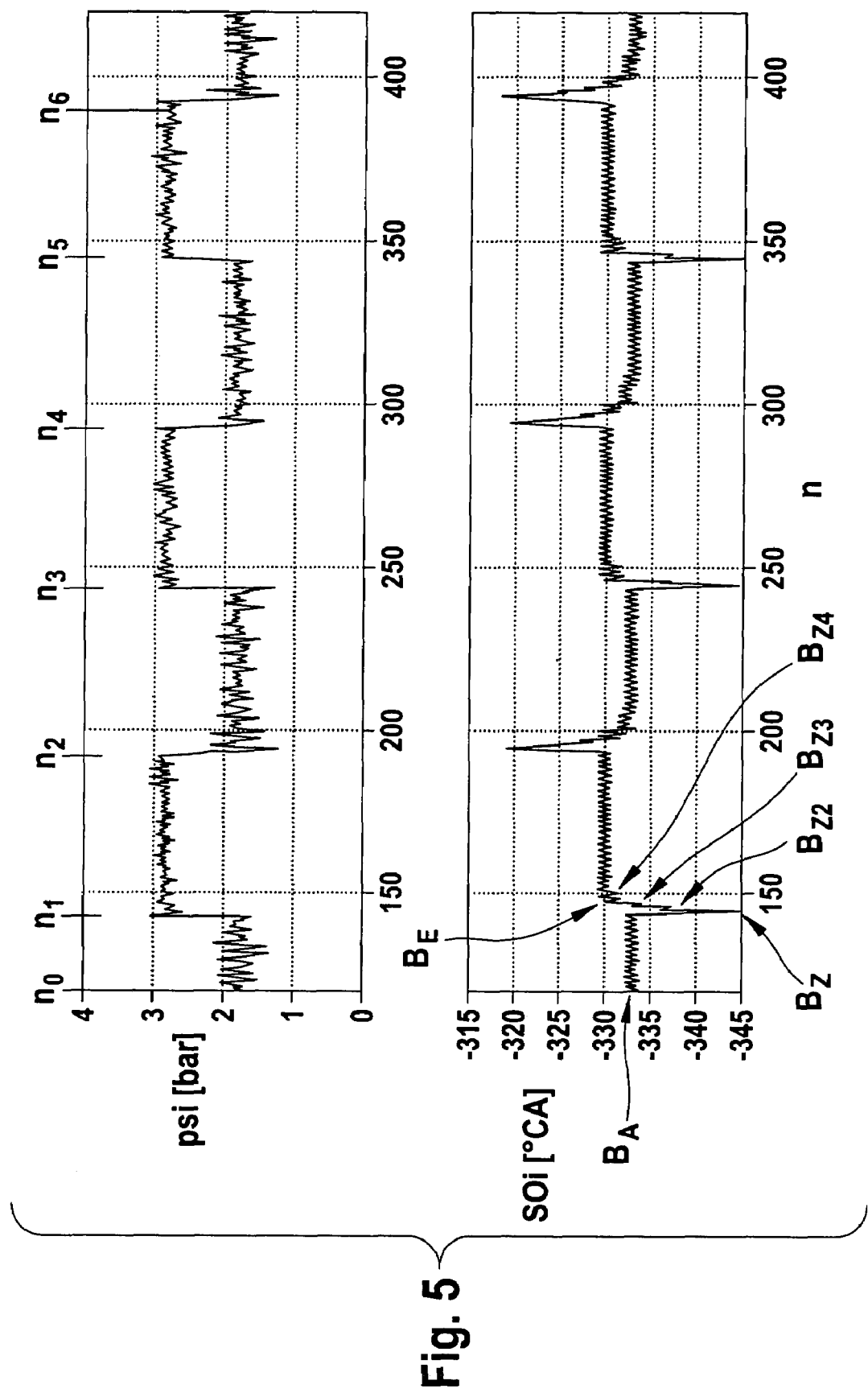

FIG. 1 a drawing of a cylinder of an internal combustion engine;

FIG. 2 a diagram of the combustion chamber pressure versus the crankshaft angle;

FIG. 3 opening and closing times of the charge-cycle valves;

FIG. 4 diagrams of the mean effective pressure and the injection initiation point versus time for a cylinder in a procedure according to the state of the art;

FIG. 5 diagrams of the mean effective pressure and the injection initiation point versus time for a cylinder in a procedure according to the invention.

FORMS OF EMBODIMENT OF THE INVENTION

The technological environment of the invention is first described using FIGS. 1 to 3. In FIG. 1 a cylinder 1 is depicted of an otherwise unspecified internal combustion engine, which as a rule consists of multiple cylinders. The cylinder 1 comprises a combustion chamber 2, in which a piston 3 with a connecting rod 4 is disposed with the capability of displacement. The connecting rod 4 is connected to an unspecified crankshaft. An inlet 5 with an intake valve EV opens out into the combustion chamber 2. Additionally an exhaust outlet 7 with an exhaust valve AV opens out into the combustion chamber 2. The intake valve EV as well as the exhaust valve AV is electrohydraulically actuated. The internal combustion engine is therefore equipped with a so-called electrohydraulic valve control system (EHVS). An electrohydraulic valve control system allows for an actuation of the valves independent of the crankshaft position. Ambient air is drawn into the combustion chamber 2 across the inlet 5. The combustion exhaust gases are released again to the ambient surroundings across the exhaust outlet 7. By means of a suitable opening time of the exhaust valve AV, for example an opening of the exhaust valve AV during the intake stroke of the internal combustion engine, a so-called internal exhaust gas recirculation can be implemented, in that exhaust gas in fact flows back, respectively is drawn back, out of the exhaust outlet 7 into the combustion chamber 2 during the intake stroke of the cylinder 1.

A spark plug 11 as well as a fuel injector 12 opens out into the combustion chamber 2 in a known manner. The fuel injector 12 is preferably a piezoelectric fuel injector or an electrohydraulic fuel injector. The fuel injector 12 is connected to an unspecified high pressure rail by way of a high pressure line 10. The high pressure line 10 carries fuel to the fuel injector 12. The fuel injector 12 is actuated electrically by a control unit 9. The spark plug 11 as well as the intake valve EV and the exhaust valve AV is also actuated accordingly by the control unit 9. Provision can be made here for multiple intake valves EV and multiple exhaust valves AV instead of one intake valve EV and one exhaust valve AV.

In electrohydraulic valve control systems without camshaft (EHVS), as they, for example, are known from the German patent DE 10127205 and the German patent DE 10134644, lift and control times of the charge-cycle valves of an internal combustion engine can in principle be freely programmed. The charge-cycle valves are in this instance the individual or the multiple intake valve(s) EV and the individual or the multiple exhaust valve(s) AV.

FIG. 2 shows a diagram of the compression chamber pressure in the compression chamber 2 of the internal combustion chamber versus the crankshaft angle in degrees of crankshaft revolution (° KW). To the right of the ordinate, a crankshaft angle from −180° to 540° is depicted. The combustion chamber pressure is plotted in bar above the abscissa. Top dead center in the charge cycle L-OT is randomly selected here. The charge cycle makes for the discharge of combusted exhaust gases in a known manner. This takes place here in a crankshaft angle range between −180° and 0°. The charge cycle also makes for the intake of fresh ambient air, respectively a fuel-air mixture, which takes place here in a crankshaft angle range from 0-180°. Top dead center of the ignition (ignition TDC) is achieved one crankshaft revolution further at 360° of crankshaft revolution. The compression stroke takes place between 180° and 360° of crankshaft revolution. The expansion of the combusting gases takes place between 360° and 540° of crankshaft revolution. The individual strokes are denoted in FIG. 2 with exhaust AU from −180° to 0°, intake AN from 0° to 180°, compression stroke (compression) V from 180° to 360° and power (combustion) E from 360° to 540°. During the compression stroke V, the air, respectively fuel-air mixture or fuel-air-exhaust gas mixture, is compressed and in so doing heated. The mixture as a rule is ignited shortly before ignition top dead center has been achieved. This can occur by an externally-supplied ignition, which is customary with gasoline engines, or by a controlled self-ignition in accordance with the mode of operation according to the invention. The ignition of the mixture leads in a known way to a pressure increase, which in the immediately subsequent power stroke of expansion E is converted into mechanical energy.

In FIG. 3 the opening and closing of the intake valve EV as well as the exhaust valve AV are depicted in each case. The exhaust valve AV in a 4-stroke engine is customarily opened during the exhaust stroke between −180E and 0E of crankshaft revolution; and the intake valve EV is then correspondingly opened in the range of the intake stroke between 0E of crankshaft revolution and 180E of crankshaft revolution. In FIG. 3 four cases are depicted, which in each case represent different valve opening strategies. In FIG. 3.1 the customary valve opening strategy is depicted, in which the exhaust valve AV is opened shortly before bottom dead center UT is achieved and stays open approximately until −90E of crankshaft revolution. Thus, a part of the combusted exhaust gases remains in the combustion chamber 2. The intake valve EV is first opened at approximately 90E of crankshaft revolution as soon as the pressure equilibrium exists between the combustion chamber 2 and the engine air intake and remains open approximately until bottom dead center is achieved. In this way a so-called negative valve overlap is brought about, which sees to it that a part of the combusted exhaust gases remain in the combustion chamber 2 and which serves to warm the fuel-air mixture brought into the combustion chamber 2 during the intake stroke. In this way a fuel-air-exhaust gas mixture is produced in the combustion chamber 2.

FIG. 3.2 shows an alternative actuation strategy for the intake and exhaust valves. In this case the exhaust valve AV remains open between bottom dead center UT and top dead center OT, and the intake valve accordingly stays open between top dead center and bottom dead center. A very short overlapping of the valves takes place in the region of top dead center. During the opening of the intake valve EV, the exhaust valve AV is additionally opened in the range of approximately 90° of crankshaft revolution up to shortly before the achievement of bottom dead center; hence, the intake valve as well as the exhaust valve is open in this range so that a part of the discharged exhaust gases is again conveyed across the exhaust valve back into the combustion chamber 2.

In FIG. 3.3 an additional valve control strategy is depicted, in which the exhaust valve AV stays open from bottom dead center UT across top dead center OT almost up to bottom dead center at approximately 180° of crankshaft revolution. Additionally the intake valve EV is opened approximately between 90° of crankshaft revolution and bottom dead center at 180° of crankshaft revolution. Combusted gas is thus discharged out of the combustion chamber 2 between bottom dead center at −180° of crankshaft revolution and the achievement of top dead center at 0° of crankshaft revolution. The combusted gas is then drawn again out of the exhaust gas system into the combustion chamber 2 between 0° of crankshaft revolution and the closing of the exhaust valve AV at approximately 120° of crankshaft revolution. The intake valve EV is open here between approximately 90° of crankshaft revolution and the achievement of bottom dead center at 180° of crankshaft revolution in order that fresh air can be drawn in during this time. A valve overlap also occurs here, in this case approximately between 90° of crankshaft revolution and 120° of crankshaft revolution.

FIG. 3.4 shows a further variation of a valve control strategy. In this case, the exhaust valve AV is open between bottom dead center at −180° of crankshaft revolution and top dead center at 180° of crankshaft revolution. The intake valve EV is open approximately from −60° of crankshaft revolution across top dead center at 0° of crankshaft revolution up to approximately bottom dead center at 180° of crankshaft revolution. Therefore, a valve-opening overlap occurs here approximately between −60° crankshaft revolution and the achievement of top dead center at 0° of crankshaft revolution. In so doing, a part of the exhaust gas is pressed into the engine air intake and transported again back into the combustion chamber 2 during the opening time of the intake valve between top dead center at 0° of crankshaft revolution and bottom dead center at 180° of crankshaft revolution.

The valve control system in the example of embodiment of FIG. 3.1 produces a hot residual gas volume in the combustion chamber 2 and allows for a stratified fuel injection. This valve control strategy is then ideal for the stratification operation. In contrast the valve control system depicted using FIG. 3.4 is associated with a warm residual gas volume in the combustion chamber 2 and allows for a homogeneous charging of the combustion chamber 2 and in so doing for a homogeneous operation of the internal combustion engine. The valve control system according to the examples of embodiment depicted in FIG. 3.2 and 3.3 are in each case interim solutions between the extremes depicted in FIGS. 3.1 and 3.4.

Different valve and fuel injection strategies are required at different load levels. In the case of very low loads, a high residual gas rate is necessary in order to provide the required self-ignition temperature. At this engine operating point, the residual gas storage according to FIG. 3.1 is used in the combustion chamber 2, whereby the exhaust valve is closed significantly before the charge cycle-TDC (OT). The compression of the residual gas mass located in the cylinder leads to an additional temperature increase. The fuel injection occurs as soon as the piston is located in the region of the charge-cycle-TDC (OT). Due to the high temperatures, decomposition reactions of the fuel lead to reactive by-products, which significantly influence the self-ignition timing and in this instance reduce the self-ignition timing. Once pressure equilibrium is obtained between the intake manifold and the combustion chamber 2, the intake valve is opened in order to prevent losses of flow.

Moving in the direction of higher loads, the danger exists that the cylinder charge will ignite too early on account of the high temperatures; and the very fast combustion, which subsequently results, leads to pinging because small quantities of residual gas are present here. For this reason, the positive valve-opening overlap is deployed with increasing loads. This positive valve-opening overlap is depicted in the examples of embodiment for the valve control system according to FIGS. 3.2, 3.3 as well as 3.4. In the process, the required residual gas volume is drawn back out of either the exhaust port or the inlet port. The fuel injection then takes place during the compression stroke, whereby the point of injection time exerts an influence on the homogeneity of the cylinder charge. The possibility further exists to deploy an additional injection of fuel during the compression stroke. The vaporization enthalpy of the fuel causes in this instance a cooling of the cylinder charge, which counteracts a self-ignition occurring too early and a pinging combustion. The fuel injection during the compression stroke can also be combined with an injection of fuel into the compressed residual gas volume, provided that the valve control strategy of the residual gas storage is used according to FIG. 3.1. The combination of multiple injections of fuel beginning in the region of the charge-cycle-TDC (OT) across the intake stroke up into the compression stroke is also thereby possible as is depicted in FIG. 3.

At different load levels, different residual gas and fuel injection strategies are required in the mode of operation of self-ignition of a gasoline engine. For the recirculation of internal residual gas, the valve strategy for the residual gas storage (negative valve overlap) is used as previously depicted, whereby the exhaust valve is closed significantly before the charge-cycle-TDC (OT). The residual gas mass remaining in the cylinder is compressed. The intake valve opens once the pressure in the cylinder has again achieved the intake manifold pressure in order to prevent losses of flow. A larger residual gas volume is required at lower loads that at higher loads. The increase required at lower loads results from the early closing of the exhaust valve. With the aid of the direct fuel injection, the state of the fuel injection over time, respectively the state of the fuel injection with regard to the crankshaft angle, can be altered, and in so doing the state of the combustion can be altered, respectively corrected. An early injection of fuel into the compressed mass of residual gas advances the combustion power center. Misfires during the transfer from low to high loads result from an abrupt reduction in the residual gas mass, whereby the residual gas temperature in the first power stroke (cycle) after the sudden load variation still corresponds to the temperature of the low load level. With the reduction of the residual gas masses, the temperature in this case is not sufficient to achieve the self-ignition temperature. With the transfer from high to low loads, the higher temperature from the preceding power stroke with an abrupt increase in the residual gas mass leads to an early combustion in the first cycle after the load transfer. This results because the self-ignition temperature is achieved earlier.

A misfire in the self-ignition after a load transfer from low to high loads, respectively self-ignition occurring too early during a load transfer from high to low loads, is avoided by an alteration in the air pathway or an alternation in the fuel pathway. When an alteration in the air pathway occurs, a step-by-step reduction is achieved, respectively an increase in the residual gas mass by a step-by-step alteration of the closing point in time of the exhaust valve. Instead of altering the residual gas mass abruptly, a step-by-step alteration of the residual gas mass is conducted with a completely variable valve-train assembly, which is capable of adapting the control time cycle-synchronously. The step-by-step alteration is conducted over multiple power strokes. Instead of an abrupt alteration from an initial value to a target value, a transition is made step-by-step over multiple intermediate steps from the initial value to the target value.

In the fuel pathway, a misfire as a result of too low of a residual gas temperature can be counteracted with the aid of an early fuel injection. When the temperature is sufficiently high during the compression of the residual gas, an early injection of fuel leads to a pre-reaction of the fuel-air-residual gas mixture, whereby the fuel is already partially converted, and energy is simultaneously released. This conversion accelerates the self-ignition and counteracts misfires. As a countermeasure during a load transfer from a high to a low load, the fuel injection can occur later in the first cycle after the sudden load variation in order to counteract the early combustion.

FIG. 4 shows a diagram of the mean effective pressure (upper diagram) pmi in bar versus the power strokes n as well as a diagram of the injection initiation point SOI in ° of crankshaft revolution (° KW) before the ignition-TDC (OT)

versus the power strokes n, which in each case concern a procedure according to the state of the art.

FIG. 5 shows an example of embodiment of a procedure according to the invention with a shift in the injection initiation point in a depiction according to FIG. 4. In FIG. 4 the indicated mean effective pressure pmi in bar is depicted in the upper portion of the diagram versus a time axis. Between a power stroke $n_0$ up to a power stroke $n_1$, the cylinder, respectively the internal combustion engine, is operated with a load, which results in a mean effective pressure pmi of approximately 2 bar. A sudden load variation occurs at the power stroke $n_1$ to a load, which results in a mean effective pressure of approximately 3 bar. This load is maintained until power stroke $n_2$, at which a load step takes place back to the load, which was maintained between the power strokes $n_0$ and $n_1$. In the diagram several repetitions of such steps at times $n_3$, $n_4$, $n_5$ and $n_6$ are depicted. In the lower portion of the diagram of FIG. 4, the injection initiation point is depicted in degrees of crankshaft rotation (° KW) before ignition-TDC (OT). At a mean effective pressure of approximately 2 bar, this point lies at approximately −334°; at a mean effective pressure of 3 bar, this point lies at approximately −330°. An abrupt shift of the injection initiation point takes place on account of the load transfer from a mean effective pressure of 2 bar to a mean effective pressure of 3 bar, respectively vice versa. In so doing, very high overshoots, respectively undershoots, of the indicated mean effective pressure pmi arise at the power strokes of the load transfer. At the power strokes $n_3$ and $n_5$, misfires, for example, occur, which manifest themselves in a very low mean effective pressure. The misfires are denoted here with A. At these power strokes a pronounced overshooting additionally occurs upwards, which manifests itself in pressure peaks up to, for example, approximately 4 bar at the power strokes $n_3$ and $n_5$.

In FIG. 5 the pressure curve as well as the injection initiation point is depicted according to the depiction of FIG. 4 for an example of embodiment of a procedure according to the invention. A load transfer takes place here too at different power strokes from a load, which results in a mean effective pressure of approximately 2 bar, to a load, which results in a mean effective pressure of approximately 3 bar. A shift is thereby made at power stroke $n_1$ from the low load as the initial load to the high load as the target load. At the power stroke $n_2$, the shift is accordingly reversed from the high load as the initial load to the low load as the target load; at power stroke $n_3$ the shift is in turn made from the low to the high load; at power stroke $n_4$ from the high to the low; at power stroke $n_5$ from the low to the high and at the power stroke $n_6$ from the high to the low. Values for the injection initiation point SOI are in each case assigned to the high and low load. The value assigned to the initial load for the injection initiation point is denoted here as the initial value; and accordingly the value assigned to the target load is denoted as the target value. The load values can correspondingly be assigned initial and target values for the exhaust gas recirculation.

The depiction in FIG. 5 begins at power stroke $n_0$, which corresponds to FIG. 4. As can be seen in the lower diagram of FIG. 5, in which the injection initiation point is plotted in degrees of crankshaft revolution (EKW) before the ignition-TDC (OT), the injection initiation point is momentarily advanced to an interim value $B_Z$, for example at the point in time from approximately −334E of crankshaft revolution KW to −345E of crankshaft revolution KW, during a shift from a low to a high load and in so doing from a low mean effective pressure pmi to a high mean effective pressure pmi. During an alteration from a high mean effective pressure to a low mean effective pressure, as this, for example, takes place at power stroke $n_2$, and thereby an alteration from a high to a low load, the point of injection time is correspondingly retarded for a power stroke to an interim value $B_Z$, for example from approximately −330E of crankshaft revolution KW to −318E of crankshaft revolution KW, as is depicted in the power stroke $n_2$. At the power stroke $n_1$ the injection initiation point SOI is shifted from an initial value $B_A$ of approximately 334E of crankshaft revolution KW to an interim value $B_Z$ of approximately −345E of crankshaft revolution KW. During the immediately subsequent power strokes, a target value $B_E$ of approximately −330E is achieved step-by-step by way of the interim values $B_{Z2}$, $B_{Z3}$, $B_{Z4}$. The injection initiation point SOI is, therefore, momentarily advanced by almost 10E of crankshaft revolution KW in order that it then may be brought step-by-step to the target value $B_E$ assigned to the target load. At the power stroke $n_2$ a reversed load alteration takes place, namely from a high load to a low load. For this purpose, the fuel injection is retarded momentarily for a power stroke, in this instance to a value of approximately −320E of crankshaft revolution KW, in order thereby to bring it step-by-step over the next power strokes to a target value of approximately −333E of crankshaft revolution KW.

An example of embodiment of the procedure according to the invention for a shift of the injection initiation point was depicted using FIGS. 4 and 5. An alteration of the residual gas volume can correspondingly be achieved by an alteration of the valve-train assembly. This follows the same pattern, in that a shift is not directly made from an initial value to a target value; but to an interim value other than the target value, which then by way of the next power strokes is altered step-by-step to the target value.

The curve of the mean effective pressure in the upper diagram of FIG. 5 shows that by advancing, respectively retarding, the injection initiation point, only a slight undershooting, respectively overshooting, of the mean effective pressure arises. Especially no misfires occur as in the procedure according to the state of the art.

The invention claimed is:

1. A control unit configured to control operation of an internal combustion engine, particularly a gasoline engine with direct gasoline injection and controlled self-ignition, wherein the internal combustion engine comprises a combustion chamber, at least one intake valve and at least one exhaust valve each having an adjustable opening time, the control unit executing instructions causing compression of an ignitable mixture that contains residual gas in the combustion chamber during a compression stroke, wherein the gas mixture self ignites during the compression stroke, and wherein during a load transfer from an initial load to a target load, at least one of a residual gas volume and an injection point of time is altered step-wise over multiple combustion cycles to an interim value other than the value assigned to the target load.

2. A computer program that operates an internal combustion engine with a program code for the implementation of instructions, if the program is executed on a computer, the computer program comprising instructions for compressing an ignitable gas mixture that contains residual gas in the combustion chamber during a compression stroke, wherein the gas mixture self ignites; and altering step-wise over multiple combustion cycles at least one of a residual gas volume and a point of injection time to an interim value other than a value assigned to a target load during a load transfer from an initial load to the target load.

3. A method of operating an internal combustion engine with direct gasoline injection and controlled self-ignition, wherein the internal combustion engine comprises a combustion chamber, at least one intake valve, and at least one exhaust valve, wherein the at least one intake valve and at least one exhaust each have an adjustable opening time, the method comprising:

compressing an ignitable gas mixture that contains residual gas in the combustion chamber during a compression stroke wherein the gas mixture self ignites; and altering step-wise over multiple combustion cycles at least one of a residual gas volume and a point of injection time to an interim value other than a value assigned to a target load during a load transfer from an initial load to the target load.

4. A method according to claim 3, further comprising during a load transfer from a low to a high load, increasing the residual gas volume for at least one power stroke to an interim value and subsequently decreasing the residual gas volume step-by-step to the target value.

5. A method according to claim 3, further comprising during a load transfer from a high to a low load, decreasing the residual gas volume for at least one power stroke to an interim value and subsequently increasing the residual gas volume step-by-step to the target value.

6. A method according to claim 1, further comprising during a load transfer from a low to a high load, advancing the point of injection time is advanced for at least one power stroke to an interim value and subsequently retarding the point of injection time step-by-step to a target value.

7. A method according to claim 1, further comprising during a load transfer from a high to a low load, retarding the point of injection time for at least one power stroke to an interim value and subsequently advancing the point of injection time step-by-step to a target value.

* * * * *

UNITED STATES PATENT AND TRADEMARK OFFICE
CERTIFICATE OF CORRECTION

PATENT NO. : 7,680,584 B2
APPLICATION NO. : 11/880958
DATED : March 16, 2010
INVENTOR(S) : Karrelmeyer et al.

It is certified that error appears in the above-identified patent and that said Letters Patent is hereby corrected as shown below:

Col. 5, line 7: "between -60° crankshaft" should read --between -60° of crankshaft--

Col. 9, line 3, claim 3: "least one exhaust each" should read --least one exhaust valve each--

Col. 10, line 8, claim 6: "time is advanced for at least" should read --time for at least--

Signed and Sealed this

Sixteenth Day of November, 2010

David J. Kappos
*Director of the United States Patent and Trademark Office*